United States Patent [19]
Itoh et al.

[11] 4,075,154
[45] Feb. 21, 1978

[54] ROOM-TEMPERATURE CURING ORGANOPOLYSILOXANE COMPOSITIONS

[75] Inventors: Kunio Itoh; Toshio Takago, both of Annaka; Tamio Sato, Takasaki; Hisashi Aoki, Annaka, all of Japan

[73] Assignee: Shin-Etsu Chemical Co., Ltd., Tokyo, Japan

[21] Appl. No.: 796,865

[22] Filed: May 16, 1977

Related U.S. Application Data

[63] Continuation-in-part of Ser. No. 742,832, Nov. 18, 1976, abandoned, which is a continuation of Ser. No. 636,660, Dec. 1, 1975, abandoned.

[30] Foreign Application Priority Data

Nov. 29, 1974 Japan .................................. 49-138056

[51] Int. Cl.$^2$ ............................................. C08L 83/04
[52] U.S. Cl. ............................ 260/37 SB; 260/46.5 G
[58] Field of Search ...................... 260/37 SB, 26.5 G

[56] References Cited

U.S. PATENT DOCUMENTS

| | | | |
|---|---|---|---|
| 3,341,486 | 9/1967 | Murphy | 260/37 SB |
| 3,359,237 | 12/1967 | Boissieras et al. | 260/46.5 G |

*Primary Examiner*—Lewis T. Jacobs
*Attorney, Agent, or Firm*—Toren, McGeady and Stanger

[57] ABSTRACT

Improved organopolysiloxane compositions curable at room temperature into rubber-like elastomers comprising a. a hydroxy-terminated diorganopolysiloxane,
b. a substituted-aminoxy group containing organopolysiloxane,
c. a salt of a metal, such as, calcium, zinc, aluminum, tin and iron, and
d. an inorganic filler, such as, calcium carbonate, magnesium hydroxycarbonate and calcium hydroxide, having a basicity sufficient to compensate for the acidity of component c).

The compositions exhibit uniform curability throughout the depth of the mass of the composition, even at relatively high temperatures.

15 Claims, No Drawings

ROOM-TEMPERATURE CURING ORGANOPOLYSILOXANE COMPOSITIONS

CROSS REFERENCE TO RELATED APPLICATIONS

This application is a Continuation-in-Part of application Ser. No. 742,832, filed Nov. 18, 1976, now abandoned, which, in turn, is a Continuation of Ser. No. 636,660, filed Dec. 1, 1975, now abandoned.

BACKGROUND OF THE INVENTION

1. Field of the Invention

This invention relates to a room-temperature curing organopolysiloxane composition or, in particular, to a room-temperature curing organopolysiloxane composition which is cured by the mechanism of a condensation reaction releasing a hydroxyamino compound and which exhibits uniform curability through the surface to the depth of a mass of the composition at relatively high temperatures.

2. Description of the Prior Art

Room-temperature curing organopolysiloxane compositions of the dehydroxyamination type are known. Specifically known is an organopolysiloxane composition which is curable into a rubber-like elastomer by cross-linking wherein a condensation reaction in the presence of organometallic catalysts takes place which releases a hydroxyamino compound. Such materials are usually placed in a mold so that the mass of the material to be cured has some definite thickness. As a result, the organopolysiloxane composition has a disadvantage in that, although the cure near the surface of the mass of the composition exposed to the atmosphere is sufficient, the cure in the interior of the mass is not always satisfactory. This is because the hydroxyamino compound which is released in the interior of the mass only dissipates minimally into the atmosphere and thus remains in situ. Moreover, the hydroxyamino compound remaining in the mass works to deteriorate the quality of the rubber form after curing due to its catalytic effect on degradation of the siloxane linkages.

In addition, the known organopolysiloxane compositions are difficult to uniformly cure to a sufficient degree within the mass at a relatively high temperature, say, from 30° to 70° C, to produce good rubbery elastomers.

SUMMARY OF THE INVENTION

It is the general object of this invention to provide room-temperature curing organopolysiloxane compositions that are free of the above-described disadvantages and exhibit uniform curability from the surface to the interior of the composition in a mass, even at relatively high temperatures.

The above and other objects of this invention are accomplished by a composition comprising (a) 100 parts by weight of a diorganopolysiloxane terminated at both chain ends with hydroxy groups bonded directly to terminal silicon atoms, (b) from 0.1 to 30 parts by weight of a nitrogen-containing organosilicon compound having substituted aminoxy groups represented by the general formula

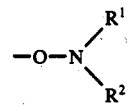

where $R^1$ and $R^2$ are each the same or different monovalent hydrocarbon groups, or by the general formula

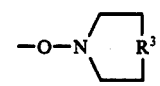

where $R^3$ is a divalent organic group, the average number of such aminoxy groups being at least 2.01 per molecule, (c) from 0.05 to 10 parts by weight of a salt of a metal selected from the metallic elements belonging to the second, third, fourth and eighth groups in the Periodic Table, said salts having at least one inorganic counter anion, and (d) from 1 to 200 parts by weight of an inorganic filler with basicity.

Particularly, we have discovered that by the use of the salt of the metal wherein the counter anion to the metal is inorganic, the detrimental effects of released hydroxy amino compound can be avoided.

DETAILED DESCRIPTION OF THE INVENTION

This invention is a result of extensive studies by the inventors to improve the poor curability of the dehydroxyamination-type organopolysiloxane compositions, and their discovery that the incorporation of a certain metal salt combined with an inorganic filler with basicity into the compositions has a remarkable effect with respect to this purpose. With the organopolysiloxane compositions of this invention, satisfactory cure of thick sections or thick masses, for example, at depths of about 1,000 mm from the surface, can be accomplished to practically the same degree usually obtained by curing thinner sections of such material or wherein its surface layer is exposed to the atmosphere. The compositions are also curable evan at a relatively high temperature, e.g., 30° to 70° C, to produce rubbery elastomers having excellent properties.

To describe this invention in further detail, the main component (a) in the composition of the present invention is a compound known in the prior art for use in silicone rubber compositions. It is a diorganopolysiloxane having hydroxy groups bonded directly to the terminal silicon atoms at both chain ends expressed by the average unit formula

where R is a substituted or unsubstituted monovalent hydrocarbon group and $a$ is a positive number from 1.9 to 2.05 inclusive.

The substituted or unsubstituted monovalent hydrocarbons are exemplified by alkyl groups, such as, methyl, ethyl, and propyl groups, alkenyl groups, such as, vinyl and allyl groups, cycloalkyl groups, aryl groups and aralkyl groups and halogen- or cyano-substituted groups corresponding thereto. It is preferable that the viscosity of the diorganopolysiloxane as component (a) is higher than 300 centipoise or, preferably, higher than 1,000 centipoise at 25° C so that the cured products will possess excellent mechanical strengths and exhibit satisfactory rubber-like elasticity. Although the upper limit of viscosity for component (a) is not important, viscosities lower than 10,000 centipoise or, particularly, lower than 10,000 centipoise at 25° C are recommendable when the composition concerned is intended for use as sealing material where a certain fluidity is required.

Component (b) of the present invention is a nitrogen-containing organosilicon compound having substituted aminoxy groups represented by formula (I) or (II) above, with the average number per molecule being at least 2.01. The symbols $R^1$ and $R^2$ in formula (I) each represent the same or different monovalent hydrocarbon groups, such as, methyl, ethyl, propyl, and phenyl groups and the symbol $R^3$ in formula (II) represents a divalent organic group, exemplified by the following:

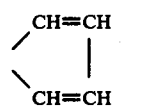 (1)      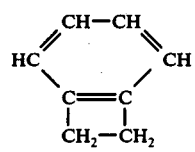 (2)

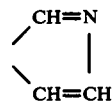 (3)      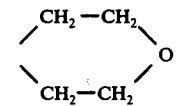 (4)

One example of the nitrogen-containing organosilicon compound suitable as component (b) is an organopolysiloxane represented by the general formula $$(R)_n Si(Y)_{4-n} \tag{III}$$

where R is a substituted or unsubstituted monovalent hydrocarbon group, Y is a substituted aminoxy group represented by formula (I) or (II) and n is 0, 1 or 2. The compounds represented by formula (III) are exemplified by the following organosilicon compounds.

| | |
|---|---|
| (1) $Si(ONEt_2)_4$ | (2) $MeSi(ONPr_2)_3$ |
| (3) $PhSi(ONMeEt)$ | (4) |
| | ViMeSi$\left( ON\begin{array}{c}CH_2-CH_2\\ \diagup \quad \diagdown \\ \diagdown \quad \diagup \\ CH_2-CH_2\end{array}O \right)_2$ |
| (5) $(ClC_6H_4)MeSi(ONPh_2)_2$ | (6) $PhCH_2CH_2Si(ONMe_2)_3$ |

In the formulas above and to follow, Me, Et, Pr, Vi and Ph denote methyl, ethyl, propyl, vinyl and phenyl groups, respectively.

Another example of the nitrogen-containing organosilicon compound as component (b) is a cyclic or linear organopolysiloxane having one or more of the siloxane units represented by the formula

where R and Y each have the same meanings as defined above and Z is a divalent atom, such as, oxygen, or a divalent hydrocarbon group, such as, ethylene and phenylene. The following are representative of the cyclic or linear organopolysiloxanes.

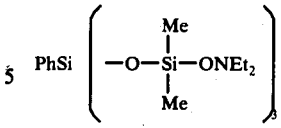 (1)

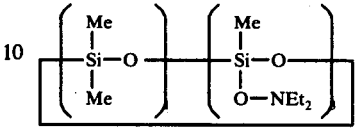 (2)

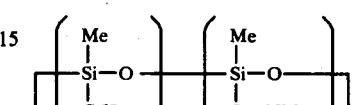 (3)

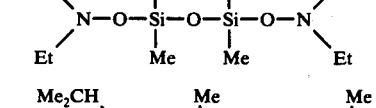 (4)

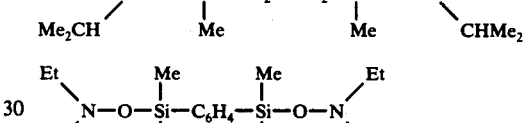 (5)

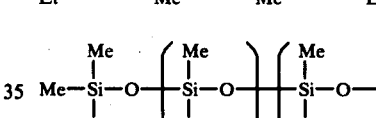 (6)

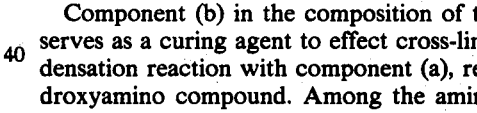 (7)

Component (b) in the composition of this invention serves as a curing agent to effect cross-linking by condensation reaction with component (a), releasing a hydroxyamino compound. Among the aminoxy-containing organosilicon compounds listed above, an organosilicon compound having only two aminoxy groups in a molecule is employed successfully if it is combined with an organosilicon compound having more than two aminoxy groups in a molecule, or if the number of the aminoxy groups per molecule is 2.01 or larger on an average, to give a cured silicone rubber with excellent rubber-like elasticity. The amount of component (b) is from 0.1 to 30 parts by weight or, preferably, from 1 to 10 parts by weight per 100 parts by weight of component (a) in order to give satisfactory cure. Any smaller amounts will result in an insufficient cure, while any larger amounts result in retarded curing as well as deterioration of cured products.

Component (c) useful in the composition of the invention is a salt of a metal selected from the metallic elements belonging to the second, third, fourth and eighth groups in the Periodic Table and having at least one inorganic counter anion. Typical of such inorganic counter anions are Cl—, $SO_4=$, $NO_3$—, OH, borate ion, and the like.

Examples of metal salts are metal halides, such as, $AlCl_3$, $AlCl_3.6H_2O$, $AlBr_3$, $AlF_3$, $FeCl_3$, $SnCl_2.2H_2O$, and $SnCl_4.5H_2O$; metal sulfates, such as, $Al_2(SO_4)_3$, $Al_2(SO_4)_3.16H_2O$, $FeSO_4.7H_2O$, $CaSO_4$, $CaSO_4.2H_2O$ and $ZnSO_4.7H_2O$; metal nitrates, such as, $Al(NO_3)_3.9H$-

$_2$O; metal borates, such as, $2Al_2O_3.B_2O_3.3H_2O$; basic metal carboxylates, such as, $(C_{17}H_{35}COO)Al(OH)_2$ ("basic" carboxylates meaning that the salt contains a basic inorganic counter anion).

The effect of component (c) is to bring about a good cure in the depths of the mass of the composition. The mechanism of this effect is presumably that the hydroxyamino compound released and formed by the crosslinking reaction and remaining in the interior of the mass is caught by component (c) to eliminate the adverse effects of the hydroxyamino compound that would otherwise be inevitable on the cured composition.

The amount of component (c) to be used to sufficiently obtain the above effect is in the range from 0.05 to 10 parts by weight or, preferably, from 0.1 to 5 parts by weight per 100 parts by weight of component (a). Amounts less than this will result in insufficient cure in the interior, while any amounts larger than this range will not produce good rubber-like elasticity because they produce too much acidity in the composition.

The inorganic fillers, as component (d), in the composition may be those employed in the usual silicone rubber compositions but they should have basicity, i.e., be basic materials. Examples of such materials are calcium carbonate, magnesium hydroxycarbonate, aluminum hydroxide, calcium hydroxide and zinc hydrocarbonate. The reason for using the inorganic filler with basicity in the formulation of the composition of this invention is that the acidity of component (c), which brings about an adverse effect on the properties of the resulting silicone rubber, should be compensated for by the basicity of component (d).

The amount of component (d) is in the range from about 1 to 200 parts by weight or, preferably, from about 30 to 100 parts by weight per 100 parts by weight of component (a). An amount less than 1 part by weight is not enough to obtain the above acid compensation effect, while amounts larger than 200 parts by weight will fail to give satisfactory silicone rubber elastomers.

Other kinds of inorganic fillers which have no basicity may be employed, if required, but always in combination with the basic inorganic fillers. Examples include fine powdered crystalline silica, fine powdered amorphous silica, silica hydrogel, silica aerogel, diatomaceous earth, calcium silicate, aluminum silicate, titanium dioxide, aluminum oxide, zinc oxide, iron oxide, carbon black, graphite, mica, clay and bentonite.

In order to prepare the room temperature curing compositions of this invention, components (a), (b), (c) and (d) are merely mixed together in any suitable fashion. Preferably, components (a), (c) and (d) are mixed first, and to this mixture is added component (b).

It is optional that other additives may be included in the formulation, insofar as no adverse effects are brought about on the properties of the composition. Examples of such materials may be pigments, heat-stability improvers and flame retardants.

The compositions of the present invention can be cured sufficiently and uniformly throughout from the surface to the depths or interior of the mass of the composition and the presence of the released hydroxyamino compound does not adversely affect the cured rubber layer. Furthermore, the curing of the composition can proceed satisfactorily even at relatively high temperatures. Because of these advantages, the compositions of the present invention find their uses in various fields, such as, for example, sealing material for deep gaps, as well as application in buildings and water tanks and potting material.

The following examples further illustrate the present invention. In the examples, all parts are parts by weight.

EXAMPLE 1

Four pasty, non-fluid mixtures were each prepared by blending 100 parts of a hydroxy-terminated dimethylpolysiloxane having a viscosity of 5,000 centipoise at 25° C and 66.7 parts of calcium carbonate on a three-roll mill, followed by the addition of powdered crystalline hexahydrated aluminum chloride $AlCl_3.6H_2O$ in the amounts given in Table I.

Into 100 parts of each pasty mixture thus prepared was added 2.5 parts of a mixed curing agent composed of two nitrogen containing cyclic organopolysiloxanes individually expressed by the formulas

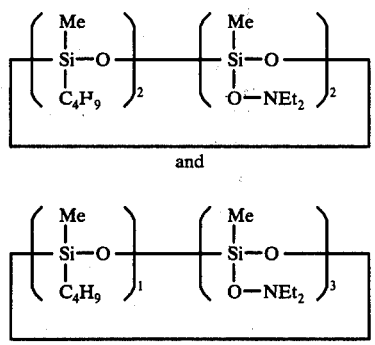

and in a ratio of 95:5 by weight, followed by thorough mixing, to produce an organopolysiloxane composition.

Each of the organopolysiloxane compositions thus obtained was put into tubes of polyvinyl chloride resin 12 mm in inner diameter and 100 mm long, and kept at 23° C or 50° C to cure.

Periodically (measured in days), the tubes were cut open and the thus cured composition in each tube was measured for its hardness at the surface layer and core section by a hardness tester of type A as specified in JIS. The details and results are set forth in Table I.

Table I

| Temperature | 23° C | | | | | | | | 50° C | |
|---|---|---|---|---|---|---|---|---|---|---|
| No. of days | 1 | | 7 | | 14 | | 50 | | 1 | |
| $AlCl_3.6H_2O$(parts) | CS | SL | CS | SL | CS | SL | CS | SL | CS | SL |
| 0 | 8 | 10 | 8 | 12 | 6 | 12 | 4 | 12 | 0 | 4 |
| 0.33 | 10 | 11 | 10 | 13 | 9 | 12 | 8 | 12 | 8 | 9 |
| 0.84 | 11 | 12 | 12 | 14 | 11 | 14 | 11 | 14 | 10 | 11 |
| 1.67 | 9 | 11 | 14 | 15 | 14 | 14 | 14 | 14 | 12 | 12 |

Notes:
CS is core section
SL is surface layer

EXAMPLE 2

To 100 parts of each of the same past mixtures of dimethylpolysiloxane and calcium carbonate as obtained in Example 1 were added 1 part each of the 6 aluminum salts, i.e., anhydrous aluminum chloride $AlCl_3$, aluminum sulfate $Al_2(SO_4)_3$, hexadecahydrate of aluminum sulfate $Al_2(SO_4)_3.16H_2O$, nonanhydrate of aluminum nitrate $Al(NO_3)_3.9H_2O$, aluminum stearate $(C_{17}H_{35}COO)Al(OH)_2$ and trihydrate of aluminum borate $2Al_2O_3.B_2O_3.3H_2O$ and 2.5 parts of the same mixed curing agent as used in Example 1.

The data of hardness shown in Table II was obtained in the same manner as in Example 1, indicating improved curability in the depths or interior of the compositions.

Table II

| Temperature | 23° C | | | | | | | | 50° C | |
|---|---|---|---|---|---|---|---|---|---|---|
| No. of Days | 1 | | 7 | | 14 | | 50 | | 1 | |
| Aluminum (salt) | CS | SL | CS | SL | CS | SL | CS | SL | CS | SL |
| $AlCl_3$ | 10 | 11 | 12 | 14 | 14 | 16 | 14 | 16 | 13 | 16 |
| $Al_2(SO_4)_3$ | 10 | 13 | 15 | 16 | 14 | 16 | 13 | 16 | 10 | 11 |
| $Al_2(SO_4)_3 \cdot 16H_2O$ | 10 | 11 | 10 | 12 | 6 | 10 | 8 | 10 | 5 | 6 |
| $Al(NO_3)_3 \cdot 9H_2O$ | 10 | 12 | 10 | 12 | 10 | 12 | 10 | 12 | 6 | 8 |
| $(C_{17}H_{35}COO)-Al(OH)_2$ | 10 | 11 | 8 | 13 | 8 | 12 | 8 | 13 | 4 | 7 |
| $2Al_2O_3 \cdot B_2O_3 \cdot 3H_2O$ | 10 | 11 | 8 | 12 | 6 | 10 | 6 | 13 | 4 | 6 |
| None | 8 | 10 | 8 | 12 | 6 | 12 | 4 | 12 | 0 | 4 |

Notes:
CS is core section
SL is surface layer

EXAMPLE 3

To 100 parts of each of the same pasty mixtures of dimethylpolysiloxane and calcium carbonate as obtained in Example 1 were added, respectively, 1 part each of the following salts of calcium, tin, iron or zinc, i.e., calcium sulfate $CaSO_4$, dihydrate of calcium sulfate $CaSO_4.2H_2O$, dihydrate of stannous chloride $SnCl_2.2H_2O$, pentahydrate of stannic chloride $SnCl_4.5H_2O$, heptahydrate of ferrous sulfate $FeSO_4.7H_2O$ and heptahydrate of zinc sulfate $ZnSO_4.7H_2O$ and 2.5 parts of the same mixed curing agent as used in Example 1. The curability at the core section and surface layer of the composition masses were examined in the same manner as in Example 1. The results are set out in Table III. As is clear from the table, the curability of the composition is found to be far better even in the deep sections of the mass or at 50° C in comparison to the case where no salt is present.

Table III

| Temperature | 23° C | | | | | | | | 50° C | |
|---|---|---|---|---|---|---|---|---|---|---|
| No. of Days | 1 | | 7 | | 14 | | 50 | | 1 | |
| Salt | CS | SL | CS | SL | CS | SL | CS | SL | CS | SL |
| $CaSO_4$ | 12 | 16 | 11 | 18 | 10 | 18 | 9 | 18 | 4 | 12 |
| $CaSO_4 \cdot 2H_2O$ | 12 | 16 | 11 | 18 | 10 | 18 | 9 | 18 | 4 | 12 |
| $SnCl_2 \cdot 2H_2O$ | 10 | 12 | 13 | 14 | 11 | 12 | 10 | 11 | 8 | 10 |
| $SnCl_4 \cdot 5H_2O$ | 8 | 10 | 13 | 14 | 13 | 13 | 12 | 13 | 10 | 11 |
| $FeSO_4 \cdot 7H_2O$ | 13 | 15 | 14 | 19 | 13 | 18 | 12 | 18 | 8 | 11 |
| $ZnSO_4 \cdot 7H_2O$ | 12 | 15 | 10 | 18 | 9 | 17 | 8 | 17 | 4 | 11 |
| None | 8 | 10 | 7 | 11 | 6 | 12 | 4 | 12 | 1 | 5 |

Notes:
CS is core section
SL is surface layer

EXAMPLE 4

To 100 parts of each of the same pasty mixtures of dimethylpolysiloxane and calcium carbonate as obtained in Example 1 were added 0.2 parts each of hexahydrate of aluminum chloride $AlCl_3 \cdot 6H_2O$ and 2.5 parts of the same mixed curing agent as used in Example 1, to finally prepare two organopolysiloxane compositions. On the other hand, an organopolysiloxane composition was prepared in a similar manner except that the addition of the aluminum salt was omitted.

Using these compositions, sheets 2 mm thick were formed and the sheets were subjected to curing at room temperature for 7 days. The properties of these sheets as cured and as aged at 180° C for 24 hours are given in Table IV, indicating that the aging has relatively small effects on the properties of the cured sheets. In the table, elongation and tensile strength were determined in accordance with JIS, while hardness was determined just the same as in Example 1.

Table IV

| | $AlCl_3 \cdot 6H_2O$ parts | Elongation, % | Tensile strength, $kg/cm^2$ | Hardness |
|---|---|---|---|---|
| As cured | 0 | 1,200 | 11 | 14 |
| | 0.2 | 1,240 | 10 | 14 |
| | 0.5 | 1,220 | 10 | 14 |
| As aged | 0 | 1,150 | 11 | 16 |
| | 0.2 | 1,110 | 10 | 17 |
| | 0.5 | 1,100 | 10 | 17 |

EXAMPLE 5

To 100 parts of the same pasty mixture of dimethylpolysiloxane and calcium carbonate as obtained in Example 1 were added 0.5 part of the hexahydrate of aluminum chloride $AlCl_3 \cdot 6H_2O$ and 2.5 parts of the same mixed curing agent as used in Example 1, to prepare an organopolysiloxane composition. This composition was put into a tube of polyvinyl chloride resin, 12 mm in inner diameter and 1,000 mm long. After 20 days of curing at room temperature, the tube was cut open to observe that the mass of the composition was uniformly cured throughout from the surface layer to the core section.

EXAMPLE 6

To 100 parts of the same pasty mixture of dimethylpolysiloxane and calcium carbonate as obtained in Example 1 was added 0.5 part of aluminum chloride hexahydrate $AlCl_3.6H_2O$. Then, 100 parts each of the mixture were admixed with 2.5 parts consisting of two curing agents selected from (a) to (h) mentioned below in a particular weight ratio, and each mixture was thoroughly mixed to produce an organopolysiloxane composition.

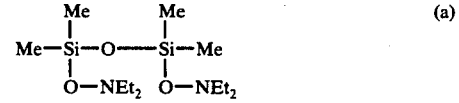
(a)

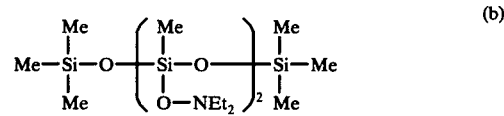
(b)

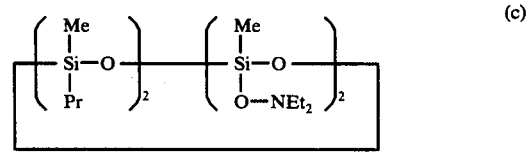
(c)

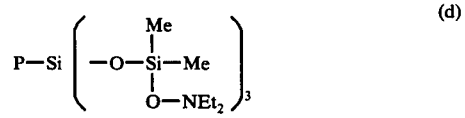
(d)

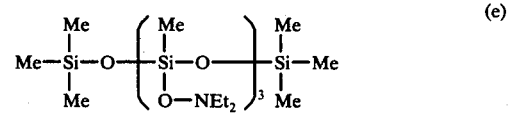
(e)

-continued (f) 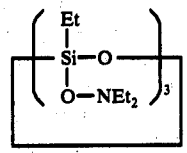

(g) 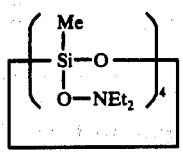

(h) 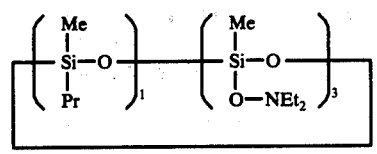

Curing tests of those compositions and determination of hardness of the cured masses were undertaken in the same manner as in Example 1. The details and results are set forth in the following Table V.

Table V

| Pair of curing agents | 23° C | | | | | | | | 50° C | |
|---|---|---|---|---|---|---|---|---|---|---|
| No. of Days | 1 | | 7 | | 14 | | 50 | | 1 | |
| | CS | SL | CS | SL | CS | SL | CS | SL | CS | SL |
| (a)/(e)* | 0 | 8 | 4 | 6 | 6 | 8 | 8 | 10 | 2 | 3 |
| (a)/(h)* | 2 | 4 | 4 | 7 | 7 | 12 | 8 | 13 | 3 | 5 |
| (b)/(e)* | 3 | 4 | 5 | 9 | 7 | 12 | 8 | 12 | 4 | 7 |
| (b)/(h)* | 10 | 12 | 11 | 14 | 12 | 14 | 12 | 14 | 11 | 12 |
| (c)/(d)* | 0 | 2 | 4 | 5 | 5 | 7 | 7 | 9 | 1 | 4 |
| (c)/(e)* | 2 | 3 | 3 | 5 | 7 | 9 | 7 | 11 | 2 | 5 |
| (c)/(f)* | 10 | 11 | 11 | 13 | 11 | 12 | 11 | 12 | 10 | 11 |
| (c)/(g)** | 11 | 13 | 12 | 15 | 11 | 15 | 13 | 15 | 11 | 13 |
| (c)/(h)** | 11 | 12 | 12 | 14 | 11 | 14 | 11 | 14 | 10 | 11 |

Notes:
*Weight ratio of 80/20
**Weight ratio of 95/5
CS is core section.
SL is surface layer

EXAMPLE 7

To 100 parts of each of the same pasty mixtures of dimethylpolysiloxane and calcium carbonate as obtained in Example 1 was added 0.2, 0.5 or 1.0 part of aluminum chloride hexahydrate AlCl$_3$.6H$_2$O. Then, to 100 parts of each aluminum chloride-added mixture thus prepared were added 2.5 parts of two aminoxy-substituted organopolysiloxanes expressed individually by the formulas

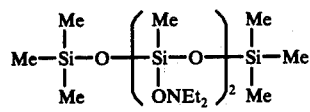

and

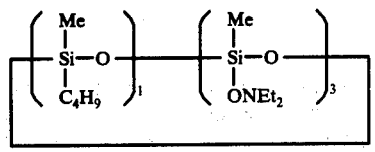

in a ratio of 80/20 by weight. For comparison, another composition was prepared just in the same manner except the addition of the aluminum chloride was omitted.

The results of the curing tests for those compositions carried out in the same fashion as in Example 1 are set out in Table VI.

Table VI

| Temperature | 23° C | | | | | | 50° C | |
|---|---|---|---|---|---|---|---|---|
| No. of Days | 1 | | 7 | | 14 | | 1 | |
| AlCl$_3$.6H$_2$O parts | CS | SL | CS | SL | CS | SL | CS | SL |
| None | 9 | 11 | 8 | 12 | 5 | 12 | 0 | 5 |
| 0.2 | 10 | 11 | 10 | 12 | 9 | 12 | 9 | 11 |
| 0.5 | 10 | 12 | 11 | 14 | 12 | 14 | 11 | 12 |
| 1.0 | 11 | 12 | 12 | 15 | 13 | 14 | 12 | 12 |

Note:
SC is core section
SL is surface layer

EXAMPLE 8

To 100 parts of the same pasty mixture of dimethylpolysiloxane and calcium carbonate as obtained in Example 1 was added 0.5 part of aluminum chloride hexahydrate AlCl$_3$.6H$_2$O. Then, to 100 parts of each thus obtained added 0.5, 0.7 or 1.0 part of a curing agent, i.e., 1,3,5-tri(diethylaminoxy)-1,3,5,7,7-pentamethylcyclotetrasiloxane of the formula

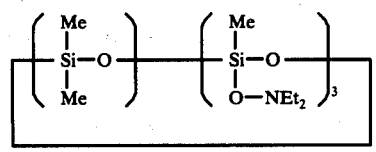

and those mixtures were well kneaded. The resulting compositions were subsequently subjected to the same curing test as in Example 1. The results are set forth in Table VII.

Table VII

| Temperature | 23° C | | | | | | 50° C | |
|---|---|---|---|---|---|---|---|---|
| No. of Days | 1 | | 7 | | 14 | | 1 | |
| Curing agent parts | CS | SL | CS | SL | CS | SL | CS | SL |
| 0.5 | 1 | 3 | 3 | 5 | 5 | 7 | 0 | 5 |
| 0.7 | 10 | 11 | 10 | 12 | 9 | 12 | 9 | 11 |
| 1.0 | 13 | 15 | 15 | 17 | 16 | 17 | 15 | 16 |

Note:
CS is core section
SL is surface layer

COMPARATIVE EXAMPLE

A pasty base mixture without fluidity was prepared on a three-roller mill by blending 100 parts of a hydroxy-terminated dimethylpolysiloxane with a viscosity of 5,000 centipoise at 25° C and 66.7 parts of calcium carbonate as a filler, followed by adding each of the metal compounds in the amount, as indicated in Table VIII.

Into 100 parts of each of the pasty base mixtures thus prepared was added 2.5 parts each of the same curing agent as employed in Example 1, to given room temperature-curing organopolysiloxane compositions. Each of the compositions was put into tubes of polyvinyl chloride resin 10 mm in inner diameter and 100 mm long and kept at 20° C or 50° C.

After 2 days or 7 days, the tubes were cut open and the compositions thus cured were tested for the hardness at the surface layer and at the core section in the same manner as in Example 1. The results are set forth in Table VIII. In the table, the aluminum chloride AlCl$_3$.6H$_2$O containing sample represents the present invention and the other four are for the comparative experiments.

Table VIII

| Metal compound (parts) | Curing at 20° C | | | | Curing at 50° C | |
|---|---|---|---|---|---|---|
| | 2 days | | 7 days | | 2 days | |
| | CS | SL | CS | SL | CS | SL |
| AlCl$_3$ . 6H$_2$O (0.5) | 9 | 11 | 11 | 13 | 9 | 11 |
| Zinc octoate (0.5) | 4 | 6 | 3 | 10 | 0 | 6 |
| Zinc octoate (2.0) | 2 | 6 | 1 | 11 | 0 | 6 |
| Aluminum acetate (0.5) | 10 | 11 | 6 | 12 | 0 | 6 |
| Aluminum acetate (2.0) | 13 | 13 | 7 | 13 | 3 | 10 |
| Dibutyltin dilaurate (0.5) | 0 | 8 | 0 | 11 | 3 | 10 |
| Dibutyltin dilaurate (2.0) | 0 | 8 | 0 | 12 | 3 | 10 |
| Iron octoate (0.5) | 6 | 9 | 3 | 11 | 0 | 6 |
| Iron octoate (2.0) | 4 | 8 | 2 | 12 | 0 | 6 |

Note:
CS is core section
SL is surface layer

What is claimed is:

1. A room-temperature curing organopolysiloxane composition comprising
   a. 100 parts by weight of a diorganopolysiloxane terminated at both chain ends with hydroxy groups directly bonded to the terminal silicon atoms,
   b. from 0.1 to 30 parts by weight of a nitrogen-containing organosilicon compound having substituted aminoxy groups represented by the general formula

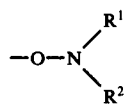

where R$^1$ and R$^2$ are each the same or different monovalent hydrocarbon groups or by the general formula

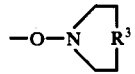

where R$^3$ is a divalent organic group, such aminoxy groups being at least 2.01 per molecule in number on an average,
   c. from 0.05 to 10 parts by weight of a salt of a metal selected from the metallic elements belonging to the second, third, fourth and eighth groups in the Periodic Table having at least one inorganic counter anion, and
   d. from 1 to 200 parts by weight of an inorganic filler with basicity.

2. The composition of claim 1 wherein the inorganic counter anion is selected from the group consisting of chloride, sulfate, nitrate, hydroxide, and borate.

3. The room-temperature curing organopolysiloxane composition as claimed in claim 1 wherein said diorganopolysiloxane is an organopolysiloxane expressed by the average unit formula

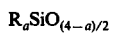

where R is a substituted or unsubstituted monovalent hydrocarbon group and $a$ is a positive number from 1.90 to 2.05 inclusive.

4. The room-temperature curing organopolysiloxane composition as claimed in claim 3 wherein said substituted or unsubstituted monovalent hydrocarbon group is selected from the class consisting of alkyl, alkenyl, cycloalkyl, aryl and aralkyl groups and halogen- or cyano-substituted groups corresponding thereto.

5. The room-temperature curing organopolysiloxane composition as claimed in claim 3 wherein said substituted or unsubstituted monovalent hydrocarbon group is a methyl group.

6. The room-temperature curing organopolysiloxane composition as claimed in claim 1 wherein said diorganopolysiloxane has a viscosity higher than 300 centipoise at 25° C.

7. The room-temperature curing organopolysiloxane composition as claimed in claim 1 wherein said diorganopolysiloxane has a viscosity higher than 1,000 centipoise at 25° C.

8. The room-temperature curing organopolysiloxane composition as claimed in claim 1 wherein said diorganopolysiloxane has a viscosity in the range from 1,000 to 10,000 centipoise at 25° C.

9. The room-temperature curing organopolysiloxane composition as claimed in claim 1 wherein said R$^1$ and R$^2$ groups are each selected from the class consisting of methyl, ethyl, propyl and phenyl groups.

10. The room-temperature curing organopolysiloxane composition as claimed in claim 1 wherein said R$^3$ group is selected from the class consisting of the groups expressed by the following formulas:

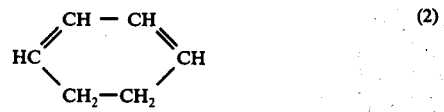

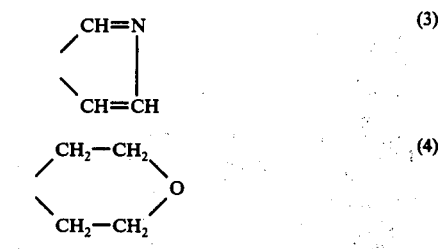

11. The room-temperature curing organopolysiloxane composition as claimed in claim 1 wherein said component (b) is an organopolysiloxane having at least 2 organosiloxane units expressed by the following formula:

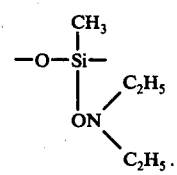

12. The room-temperature curing organopolysiloxane composition as claimed in claim 1 wherein said metallic element is selected from the class consisting of calcium, zinc, aluminum, tin and iron.

13. The room-temperature curing organopolysiloxane composition as claimed in claim 1 wherein said inorganic filler with basicity is selected from the class consisting of calcium carbonate, magnesium hydroxycarbonate, aluminum hydroxide, calcium hydroxide and zinc hydroxycarbonate.

14. A room-temperature curing organopolysiloxane composition which comprises
  a. 100 parts by weight of a dimethylpolysiloxane terminated at both chain ends with hydroxy groups directly bonded to the terminal silicon atoms and having a viscosity in the range from 1,000 to 10,000 centipoise at 25° C,
  b. from 1 to 100 parts by weight of an organopolysiloxane having at least 3 organopolysiloxane units expressed by the formula

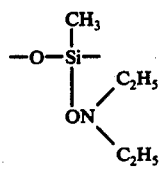

in a molecule,
  c. from 0.1 to 5 parts by weight of a metal salt selected from the class consisting of halides, sulfates, nitrates, borates and basic carboxylates of calcium, zinc, aluminum, tin or iron, and
  d. from 30 to 100 parts by weight of calcium carbonate.

15. A room-temperature curing organopolysiloxane composition which comprises
  a. 100 parts by weight of a dimethylpolysiloxane terminated at both chain ends with hydroxy groups directly bonded to the terminal silicon atoms and having a viscosity in the range from 1,000 to 10,000 centipoise at 25° C,
  b. from 1 to 10 parts by weight of a mixture of organopolysiloxanes having at least 2 organosiloxane units expressed by the formula

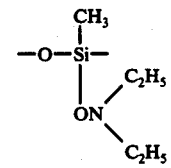

in a molecule, of which mixture the number of the same organopolysiloxane units is at least 2.01 per molecule on an average,
  c. from 0.1 to 5 parts by weight of a metal salt selected from the class consisting of halides, sulfates, nitrates, borates and basic carboxylates of calcium, zinc, aluminum, tin or iron, and
  d. from 30 to 100 parts by weight of calcium carbonate.

* * * * *